(12) United States Patent
Zhang et al.

(10) Patent No.: US 7,545,875 B2
(45) Date of Patent: Jun. 9, 2009

(54) SYSTEM AND METHOD FOR SPACE-TIME-FREQUENCY CODING IN A MULTI-ANTENNA TRANSMISSION SYSTEM

(75) Inventors: Jianzhong (Charlie) Zhang, Irving, TX (US); Kiran Kuchi, Irving, TX (US); Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 708 days.

(21) Appl. No.: 11/214,323

(22) Filed: Aug. 29, 2005

(65) Prior Publication Data

US 2006/0093057 A1 May 4, 2006

Related U.S. Application Data

(60) Provisional application No. 60/625,039, filed on Nov. 3, 2004.

(51) Int. Cl.
*H04B 7/02* (2006.01)
*H04L 1/02* (2006.01)

(52) U.S. Cl. ...................................... 375/267

(58) Field of Classification Search ................ 375/259, 375/260, 267
See application file for complete search history.

(56) References Cited

U.S. PATENT DOCUMENTS

| | | | |
|---|---|---|---|
| 6,185,258 B1 | 2/2001 | Alamouti et al. | |
| 6,542,556 B1 | 4/2003 | Kuchi et al. | |
| 6,748,024 B2 | 6/2004 | Kuchi et al. | |
| 6,865,237 B1 | 3/2005 | Boariu et al. | |
| 2002/0051433 A1 | 5/2002 | Affes et al. | |
| 2002/0126648 A1 | 9/2002 | Kuchi et al. | |
| 2002/0181390 A1 | 12/2002 | Mody et al. | |
| 2003/0081669 A1 | 5/2003 | Yousef et al. | |
| 2003/0185295 A1 | 10/2003 | Yousef | |

(Continued)

FOREIGN PATENT DOCUMENTS

WO  WO 03/043245 A1  5/2003

(Continued)

OTHER PUBLICATIONS

Andreas F. Molisch, Jack H. Winters; *Space-Time-Frequency (STF) Coding for MIMO-OFDM Systems*; IEEE Communications Letters; Sep. 2002; pp. 370-372; vol. 6, No. 9; IEEE.

(Continued)

*Primary Examiner*—David B Lugo
(74) *Attorney, Agent, or Firm*—Alston & Bird LLP

(57) ABSTRACT

A method for space-time-frequency coding pieces of data includes receiving a stream of a plurality of pieces of data in a multi-antenna transmission system, where the data may comprise a stream of orthogonal frequency division multiple access (OFDMA) symbols, orthogonal frequency division multiplexed (OFDM) symbols or the like. The pieces of data are then coded across space, time and frequency dimensions based upon a plurality of space-time-frequency (STF) codes. The pieces of data are coded such that one or more STF codes in the frequency dimension differ from one or more other STF codes in the frequency dimension. In this regard, the frequency dimension can include a plurality of frequency bins such that the pieces of data can be coded in a manner whereby the plurality of STF codes sequentially circulates through sets of at least one frequency bin in the frequency domain.

48 Claims, 6 Drawing Sheets

U.S. PATENT DOCUMENTS

| | | |
|---|---|---|
| 2003/0215006 A1 | 11/2003 | Raghothaman |
| 2003/0218973 A1 | 11/2003 | Oprea et al. |
| 2004/0105512 A1 | 6/2004 | Priotti |
| 2004/0127257 A1 | 7/2004 | Raghothaman et al. |
| 2004/0190636 A1 | 9/2004 | Oprea |
| 2004/0192218 A1 | 9/2004 | Oprea |
| 2004/0198228 A1 | 10/2004 | Raghothaman |
| 2004/0228295 A1 | 11/2004 | Zhang et al. |
| 2004/0266383 A1 | 12/2004 | Mattellini et al. |
| 2005/0002325 A1* | 1/2005 | Giannakis et al. ........... 370/208 |
| 2005/0105631 A1 | 5/2005 | Giannakis et al. |
| 2006/0018394 A1* | 1/2006 | van Zelst et al. ............ 375/260 |
| 2006/0039500 A1* | 2/2006 | Yun et al. ................... 375/299 |

FOREIGN PATENT DOCUMENTS

| | | |
|---|---|---|
| WO | WO 03/101029 A1 | 12/2003 |
| WO | WO 2004/077734 A2 | 9/2004 |
| WO | WO 2004/077778 A1 | 9/2004 |

OTHER PUBLICATIONS

Sang-Soon Park; Han-Kyong Kim, Heung-Ki Baik; *A Simple STF-OFDM Transmission Scheme with Maximum Frequency Diversity Gain*; IEEE International Symposium on Circuits and Systems; 2004; pp. IV-101-IV-104; vol. 4; ISBN 0-7803-8251-X.

Nallanathan et al., On The Performance Of MC-CDMA With Transmit Diversity Over Fast Frequency Selective Fading Channels, In Vehicular Technology Conference, 2004, May 17, 2004, 1361-1365, vol. 3.

Suto et al., Performance Evaluation Of Space-Time-Frequency Block Codes Over Frequency Selective Fading Channels, 2002 IEEE 56th Vehicular Technology Conference Proceedings, Sep. 24, 2002, 1466-1470.

David Gesbert, Da-Shan Shiu, Peter J. Smith, Anman Naguib; *From Theory to Practice: An Overview of MIMO Space-Time Coded Wireless Systems*; Apr. 2003; pp. 281-302; vol. 21, No. 3; IEEE Journal of Selected Areas in Communications.

Atul Salvekar, Sumeet Sandhu, Qinghua Li, Minh-Anh Vuong, Xiaoshu Qian; *Multiple-Antenna Technology in WiMAX Systems*; Aug. 2004; pp. 229-240 (14 pages); vol. 8, Issue 03; ISSN 1535-864X; Intel® Technology Journal.

Vahid Tarokh, Nambi Seshadri, A.R.Calderbank; *Space-Time Codes for High Data Rate Wireless Communication: Performance Criterion and Code Construction*; Mar. 1998; pp. 744-765; vol. 44, No. 2; IEEE Transactions on Information Theory.

Oghenekome Oteri, Arogyaswami Paulraj, William J. Chimitt, Keith Holt; *Space-Time-Frequency Coding for OFDM-Based WLANs*; 6 pages.

Jianzhong (Charlie) Zhong, Hua Zhang, Nico Van Waes, Tony Reid, Victor Stolpman; *Closed-Loop MIMO Precoding with Limited Feedback*; Aug. 2004; 10 pages; IEEE 802.16 Broadband Wireless Access Working Group.

Jianzhong (Charlie) Zhang, Tony Reid, Kiran Kuchi, Nico Van Waes, Victor Stolpman; *Closed-Loop MIMO Precoding with Limited Feedback*; Nov. 2004; 13 pages; IEEE 802.16 Broadband Wireless Access Working Group.

\* cited by examiner

FER PERFORMANCE OF RATE 1, CIRCULATED MATRIX A

FER PERFORMANCE OF RATE 2, CIRCULATED MATRIX B

SYSTEM AND METHOD FOR SPACE-TIME-FREQUENCY CODING IN A MULTI-ANTENNA TRANSMISSION SYSTEM

CROSS-REFERENCE TO RELATED APPLICATIONS

The present application claims priority from U.S. Provisional Patent Application No. 60/625,039, entitled: Antenna Circulation Method and Apparatus for Space-Time-Frequency Code, filed on Nov. 3, 2004, the contents of which are incorporated herein by reference in its entirety.

FIELD OF THE INVENTION

The present invention generally relates to multi-antenna systems and methods for effectuating wireless communication, and more particularly relates to multi-antenna systems and methods for space-time-frequency coding signals to provide diversity in effectuating wireless communication.

BACKGROUND OF THE INVENTION

As wireless communication systems evolve, wireless system design has become increasingly demanding in relation to equipment and performance requirements. Future wireless systems, which will be third generation (3G) and fourth generation (4G) systems compared to the first generation (1G) analog and second generation (2G) digital systems currently in use, will be required to provide high quality high transmission rate data services in addition to high quality voice services. Concurrent with the system service performance requirements will be equipment design constraints, which will strongly impact the design of mobile terminals. The 3G and 4G wireless mobile terminals will be required to be smaller, lighter, more power-efficient units that are also capable of providing the sophisticated voice and data services required of these future wireless systems.

Time-varying multi-path fading is an effect in wireless systems whereby a transmitted signal propagates along multiple paths to a receiver causing fading of the received signal due to the constructive and destructive summing of the signals at the receiver. Several methods are known for overcoming the effects of multi-path fading, such as time interleaving with error correction coding, implementing frequency diversity by utilizing spread spectrum techniques, or transmitter power control techniques. Each of these techniques, however, has drawbacks in regard to use for 3G and 4G wireless systems. Time interleaving may introduce unnecessary delay, spread spectrum techniques may require large bandwidth allocation to overcome a large coherence bandwidth, and power control techniques may require higher transmitter power than is desirable for sophisticated receiver-to-transmitter feedback techniques that increase mobile terminal complexity. All of these drawbacks have negative impact on achieving the desired characteristics for third and fourth generation mobile terminals.

Antenna diversity is another technique for overcoming the effects of multi-path fading in wireless systems. In transmit diversity, a signal is multiplexed and processed to generate a number of separate signals that are then transmitted via two or more physically separated antennas. Similarly, in reception diversity, two or more physically separated antennas are used to receive a signal, which is then processed through combining and switching to generate a received signal. Various systems, known as multiple-input multiple-output (MIMO) systems, employ both transmit diversity and reception diversity, and provide multiplexing and diversity gains in wireless communication.

One transmit diversity technique by which two transmit antennas redundantly send information to a single receiving antenna is disclosed in U.S. Pat. No. 6,185,258, entitled: Transmitter Diversity Technique for Wireless Communications, issued Feb. 6, 2001 to Alamouti et al., the contents of which is incorporated herein by reference. In accordance with the Alamouti transmit diversity technique, information is transmitted temporally during "time slots," the duration of which is small enough so that the transmission quality on each of the two channels is effectively constant during the time slot. A time slot is divided into symbol periods, each symbol period representing the time in which a single symbol is transmitted from an antenna.

In accordance with the Alamouti transmit diversity technique, in a time slot with a duration of two symbol periods, a first antenna transmits a symbol $z_1$ during the first symbol period and a symbol $-z_2^*$ during the second symbol period, and a second antenna transmits a symbol $z_2$ during the first symbol period and a symbol $z_1^*$ during the second symbol period. Here, "a*" denotes the complex conjugate of "a" (i.e., if a=x+yj, then a*=x-yj). Time slots can be referred to as "time-space slots" in recognition that more than one antenna is transmitting—emphasizing that there is space diversity—or can simply be called "slots." The Alamouti matrix $C_{Ala}$ is shown below, with each row corresponding to a transmit antenna and each column corresponding to a symbol period.

$$C_{Ala}(z_1, z_2) = \begin{bmatrix} z_1 & -z_2^* \\ z_2 & z_1^* \end{bmatrix}$$

If one of the two antennas is transmitting more robustly than the other during the time slot, both symbols can be derived solely from the stronger of the two transmissions.

During the third and fourth symbol periods, a new slot is formed in which $Z_3$ assumes the role of $z_1$ and $z_4$ assumes the role of $Z_2$, and so on for subsequent time slots and respective symbol periods. Therefore, the transmit antennas transmit according to a sequence of 2×2 Alamouti codes. The kind of matrix, such as the 2×2 Alamouti matrix, that is used to represent transmit diversity over symbol periods is called a "space-time block code."Here, the space-time block code and the time slot happen to coincide although this is not always the case. The diversity here is two or "two-fold," because each symbol is transmitted twice, by virtue of a delayed identical copy or delayed complex conjugate (or the negative of the complex conjugate or "negative complex conjugate"). Under the assumption that a single transmitter transmits one symbol per symbol period, the number of symbols that are transmitted per symbol period in a communication system is known as the "symbol rate." The symbol rate here is one since a symbol is considered to be the same, for this purpose, as its complex conjugate or negative complex conjugate.

In contrast to space-time coding techniques, such as the Alamouti transmit diversity technique, space-frequency coding techniques rely on coding across space and frequency by dividing the symbol stream into several parallel symbol streams and modulating each of these streams onto separate carriers or subcarriers at separate frequencies or within separate frequency bins. Further coding techniques, referred to as space-time-frequency coding techniques, offer a combination of space-time coding and space-frequency coding by coding symbols among transmit antennas in time and frequency. And although conventional space-time, space-frequency and space-time-frequency coding techniques are adequate to overcome at least some of the effects of multipath fading in wireless systems, it is typically desirable to improve such techniques.

SUMMARY OF THE INVENTION

In light of the foregoing background, exemplary embodiments of the present invention provide an improved transmitting multi-antenna communication entity, such as a base station, base station controller or the like, as well as an associated method and computer program product for space-time-frequency coding data, such as for transmission across a wireless network. Similarly, exemplary embodiments of the present invention provide an improved receiving network entity in a multi-antenna transmission system, such as a mobile terminal, as well as an associated method and computer program product for space-time-frequency decoding data, such as data received from across a wireless network. Exemplary embodiments of the present invention are capable of coding/decoding data in a manner that increases both diversity and coding gain in the communication system including the transmitting and receiving entities. As such, exemplary embodiments of the present invention increase performance of the communication system over conventional systems.

According to one aspect of the present invention, a method is provided for space-time-frequency coding pieces of data. The method includes receiving a stream of a plurality of pieces of data in a multi-antenna transmission system, where the data may comprise a stream of orthogonal frequency division multiple access (OFDMA) symbols, orthogonal frequency division multiplexed (OFDM) symbols or the like. Irrespective of the type of data, however, the pieces of data are thereafter coded across space, time and frequency dimensions based upon a plurality of space-time-frequency (STF) codes. In this regard, the pieces of data are coded such that one or more STF codes in the frequency dimension differ from one or more other STF codes in the frequency dimension. For example, the pieces of data can be coded based upon a plurality of STF codes each of which comprises a matrix including a plurality of columns and a plurality of rows, where the rows extend across the time and frequency dimensions and the columns extending across the space dimension. In such instances, one or more STF codes can differ from one or more other STF codes by the exchange of two or more rows of the other STF code.

The frequency dimension can include a plurality of frequency bins. In such instances, the pieces of data can be coded such that the plurality of STF codes sequentially circulates through sets of at least one frequency bin in the frequency domain. Also in such instances, the pieces of data can be coded further such that the STF code for at least some of the respective sets of frequency bin(s) extends across the time domain at the respective sets of frequency bin(s).

The method may be configured for a four-antenna transmission system. In such instances, the pieces of data can be coded based upon at least three STF codes that sequentially circulate through sets frequency bin(s) in the frequency domain. In the case of rate-one coding, for example, the pieces of data can be coded based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, \quad A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

$$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

where $S_1$, $S_2$, $S_3$ and $S_4$ represent pieces of data, and $S^*_1$, $S^*_2$, $S^*_3$ and $S^*_4$ represent complex conjugates of the respective pieces of data. Alternatively, on the case of rate-two coding, for example, the pieces of data can be coded based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, \quad B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, \quad B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, \quad B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

where $S_1$, $S_2$, $S_3$, $S_4$, $S_5$, $S_6$, $S_7$ and $S_8$ represent pieces of data, and $S^*_1$, $S^*_2$, $S^*_3$, $S^*_4$, $S^*_5$, $S^*_6$, $S^*_7$ and $S^*_8$ represent complex conjugates of the respective pieces of data.

According to other exemplary aspects of the present invention, a transmitting multi-antenna communication entity and a computer program product are provided for space-time-frequency coding data, as are a receiving multi-antenna communication entity, method and computer program product for space-time-frequency decoding data, such as data received from across a wireless network. As indicated above and explained below, the entities, methods and computer program products of exemplary embodiments of the present invention can code/decode data in a manner that increases both diversity and coding gain in the communication system. The entities, methods and computer program products increase performance of the communication system over conventional systems. As such, the entities, methods and computer program products of exemplary embodiments of the present invention may solve the problems identified by prior techniques and/or provide additional advantages.

BRIEF DESCRIPTION OF THE DRAWINGS

Figure 1:
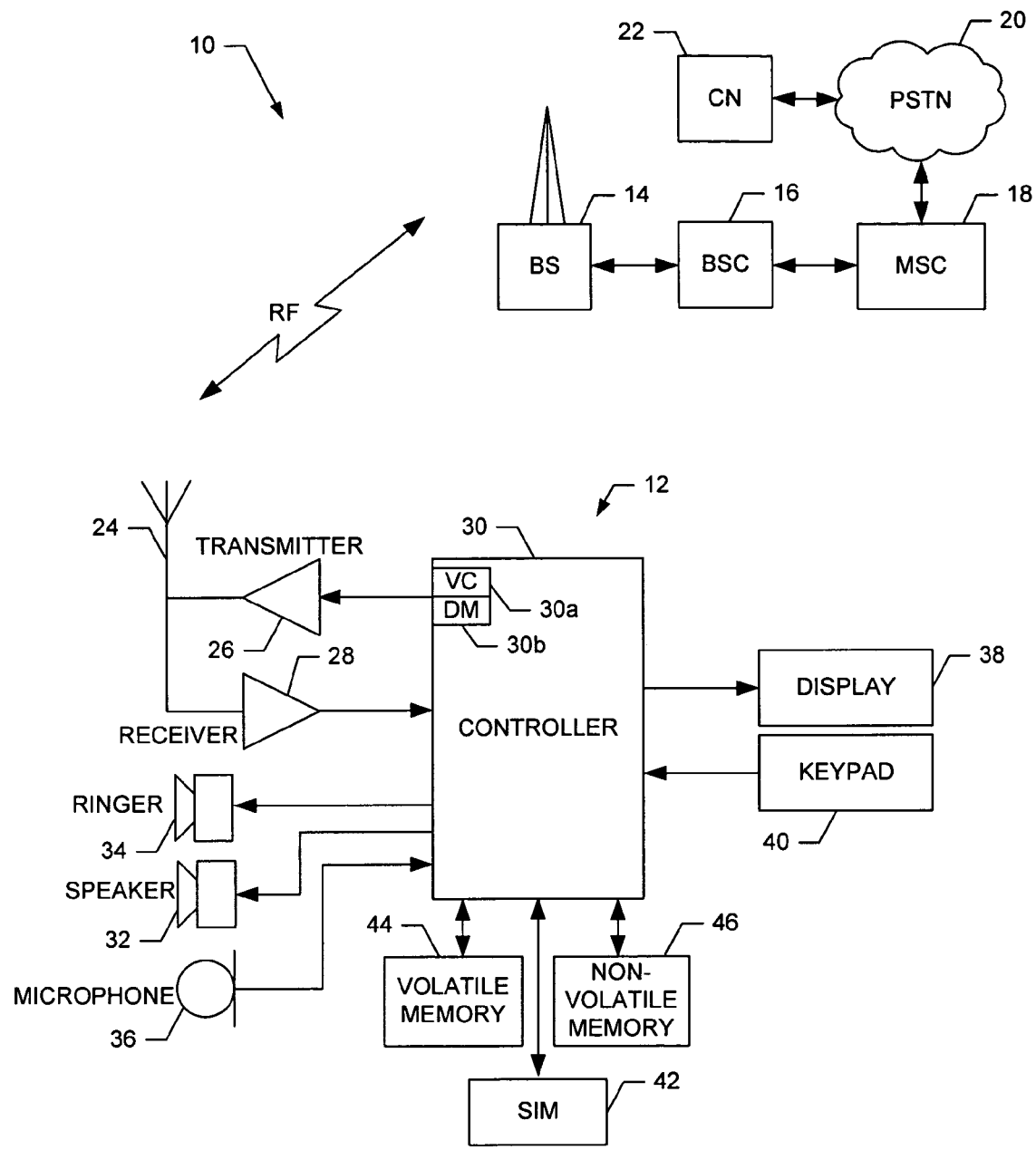
Figure 2:
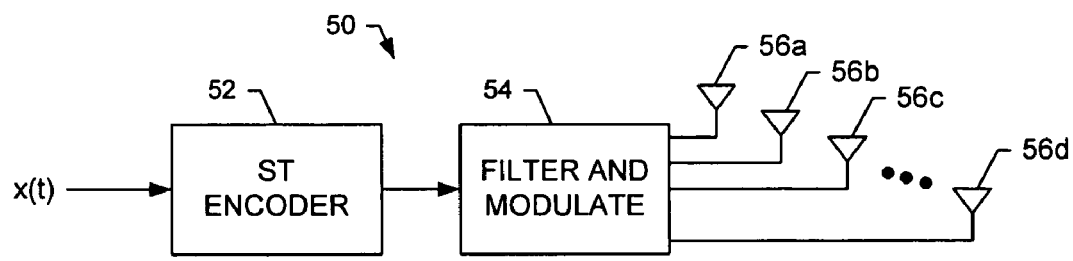
Figure 3:
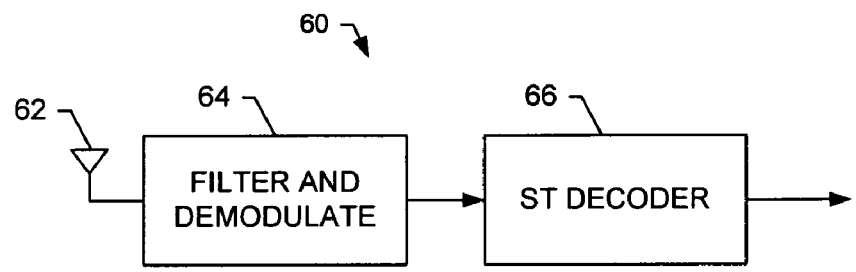
Figure 4:
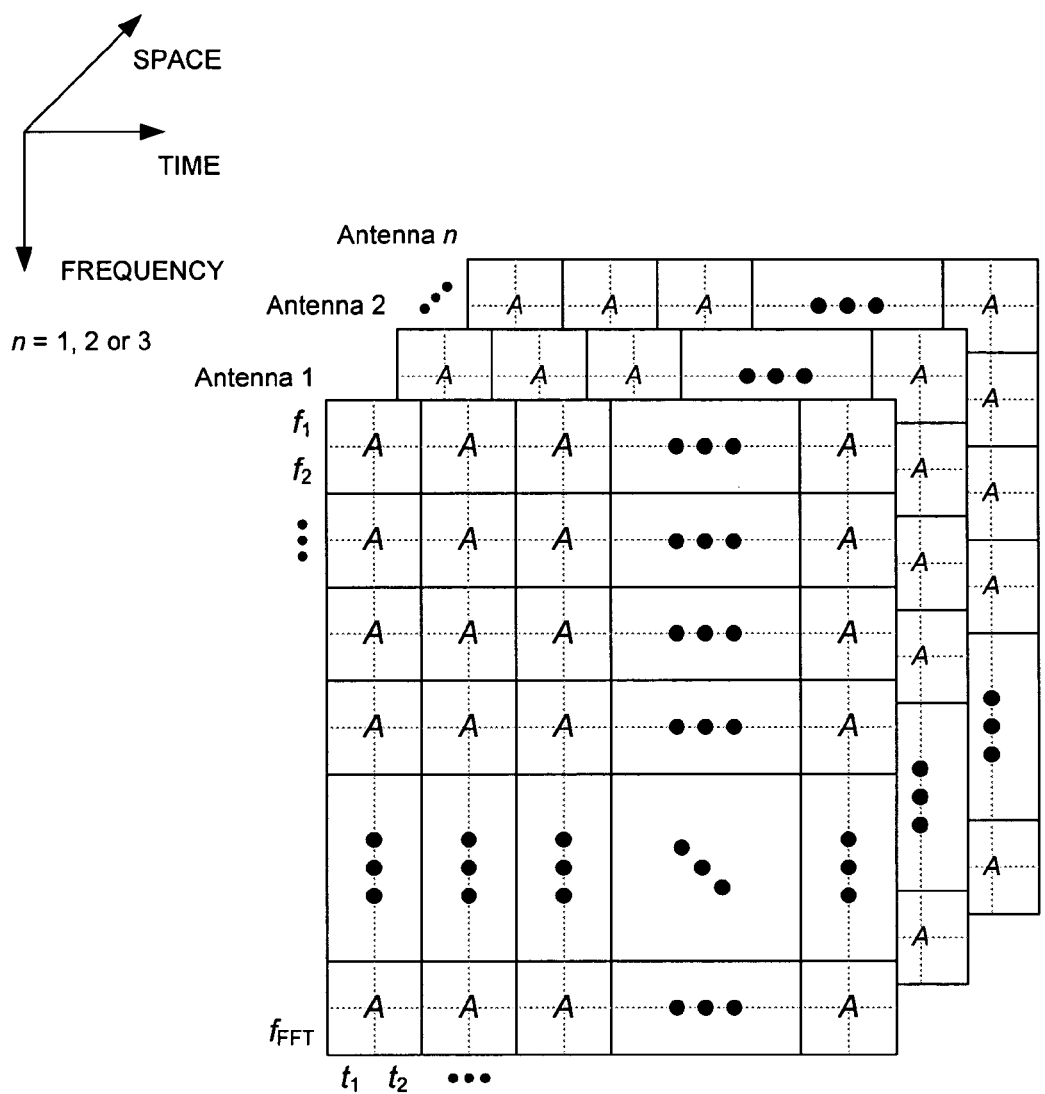
Figure 5:
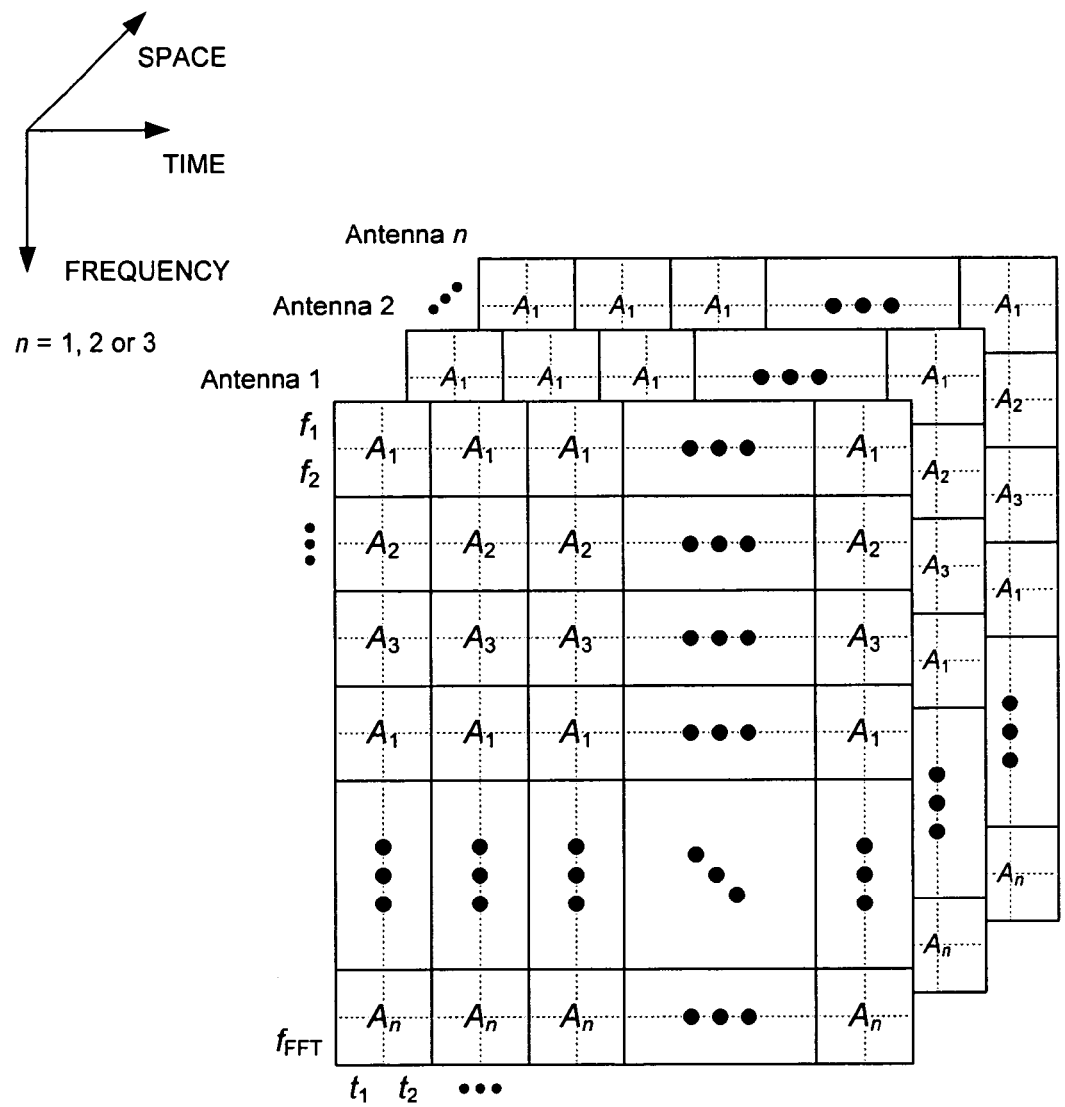
Figure 6:
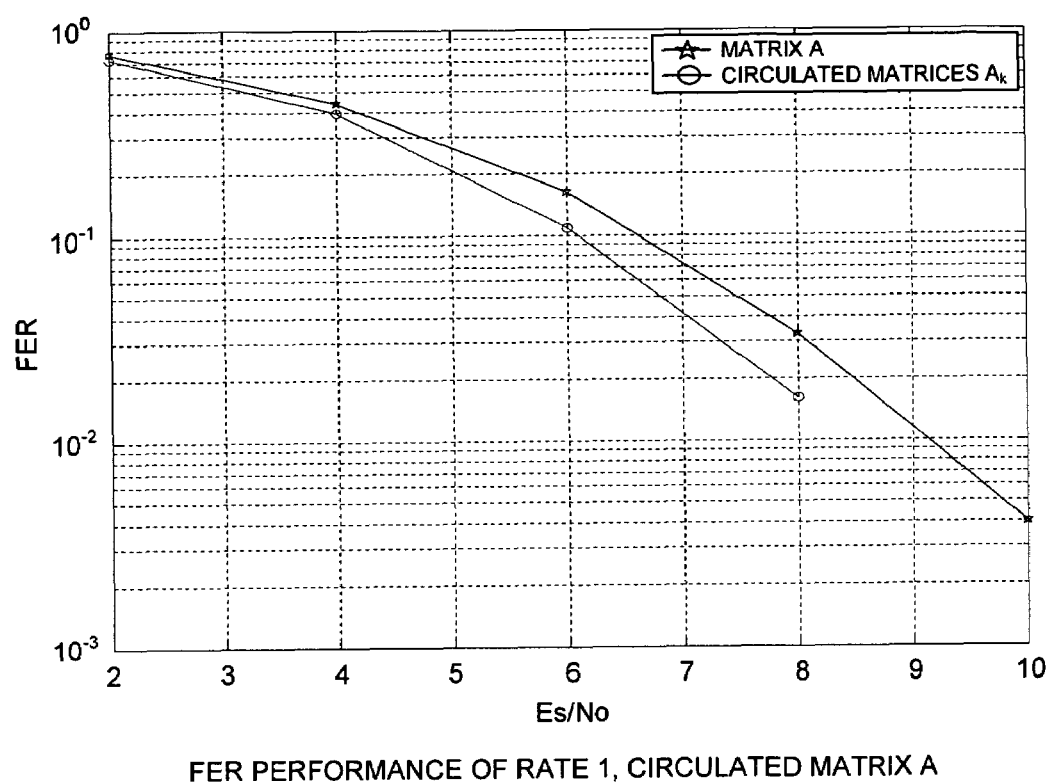
Figure 7:
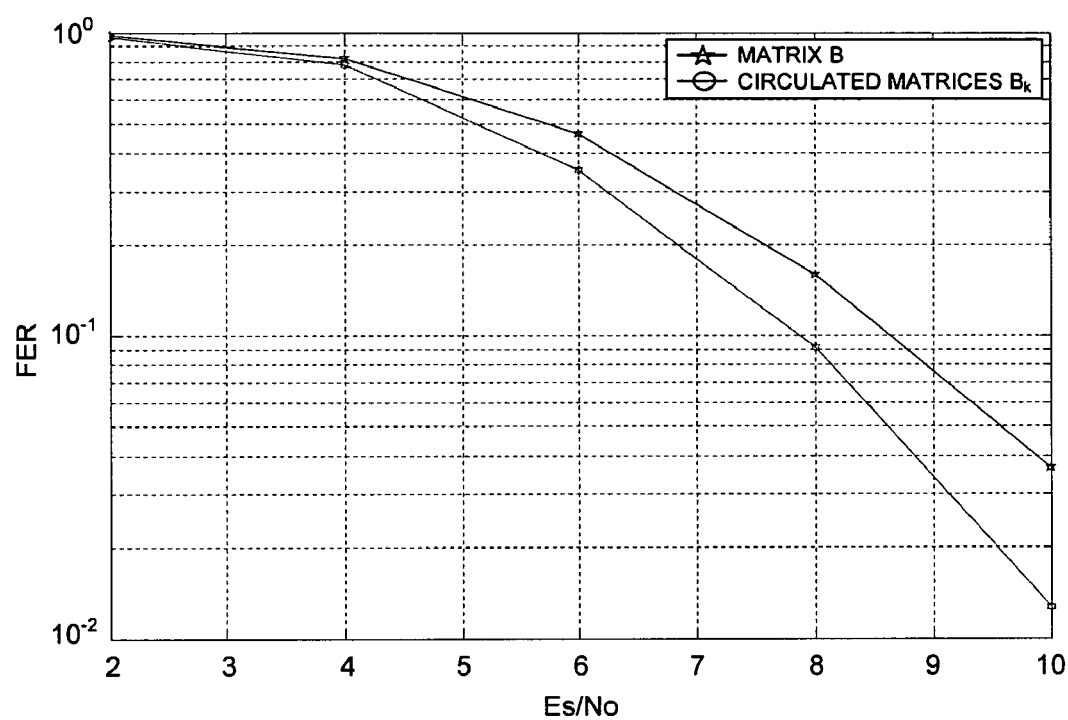

Having thus described the invention in general terms, reference will now be made to the accompanying drawings, which are not necessarily drawn to scale, and wherein:

FIG. 1 illustrates a schematic block diagram of a wireless communication system including a terminal, according to exemplary embodiments of the present invention;

FIG. 2 is a schematic functional block diagram of a multi-antenna transmitting entity of the wireless communication system of FIG. 1, according to exemplary embodiments of the present invention;

FIG. 3 is a schematic functional block diagram of a single-antenna receiving entity of the wireless communication system of FIG. 1, according to exemplary embodiments of the present invention;

FIG. 4 illustrates space-time-frequency (STF) coding of an input symbol stream with a STF code matrix A;

FIG. 5 illustrates space-time-frequency (STF) coding of an input symbol stream with circulating STF code matrices $A_k$, according to exemplary embodiments of the present invention;

FIG. 6 is a graph comparing the frame error rate (FER) of a 4-antenna multiple-input, single-output (MISO) system rate-one coding symbol streams with matrix A, with a MISO system rate-one coding symbol streams with circulating matrices $A_k$, according to exemplary embodiments of the present invention; and FIG. 7 is a graph comparing the FER of a 4-antenna MISO system rate-two coding symbol streams with matrix B, with a MISO system rate-two coding symbol streams with circulating matrices $B_k$, according to exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, an illustration of one type of wireless communications system 10 including a terminal 12 that would benefit from the present invention is provided. As explained below, the terminal may comprise a mobile telephone. It should be understood, however, that such a mobile telephone is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of voice and text communications systems, can readily employ the present invention. In addition, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

The communication system 10 provides for radio communication between two communication stations, such as a base station (BS) 14 and the terminal 12, by way of radio links formed therebetween. The terminal is configured to receive and transmit signals to communicate with a plurality of base stations, including the illustrated base station. The communication system can be configured to operate in accordance with one or more of a number of different types of spread-spectrum communication, or more particularly, in accordance with one or more of a number of different types of spread spectrum communication protocols. More particularly, the communication system can be configured to operate in accordance with any of a number of 1G, 2G, 2.5G and/or 3G communication protocols or the like. For example, the communication system may be configured to operate in accordance with 2G wireless communication protocols IS-95 (CDMA) and/or cdma2000. Also, for example, the communication system may be configured to operate in accordance with 3G wireless communication protocols such as Universal Mobile Telephone System (UMTS) employing Wideband Code Division Multiple Access (WCDMA) radio access technology. Further, for example, the communication system may be configured to operate in accordance with enhanced 3G wireless communication protocols such as 1X-EVDO (TIA/EIA/IS-856) and/or 1X-EVDV. It should be understood that operation of the embodiment of the present invention is similarly also possible in other types of radio, and other, communication systems. Therefore, while the following description may describe operation of an embodiment of the present invention with respect to the aforementioned wireless communication protocols, operation of an embodiment of the present invention can analogously be described with respect to any of various other types of wireless communication protocols, without departing from the spirit and scope of the present invention.

The base station 14 is coupled to a base station controller (BSC) 16. And the base station controller is, in turn, coupled to a mobile switching center (MSC) 18. The MSC is coupled to a network backbone, here a PSTN (public switched telephonic network) 20. In turn, a correspondent node (CN) 22 is coupled to the PSTN. A communication path is formable between the correspondent node and the terminal 12 by way of the PSTN, the MSC, the BSC and base station, and a radio link formed between the base station and the terminal. Thereby, the communications, of both voice data and non-voice data, are effectual between the CN and the terminal. In the illustrated, exemplary implementation, the base station defines a cell, and numerous cell sites are positioned at spaced-apart locations throughout a geographical area to define a plurality of cells within any of which the terminal is capable of radio communication with an associated base station in communication therewith.

The terminal 12 includes various means for performing one or more functions in accordance with exemplary embodiments of the present invention, including those more particularly shown and described herein. It should be understood, however, that the terminal may include alternative means for performing one or more like functions, without departing from the spirit and scope of the present invention. More particularly, for example, as shown in FIG. 1, in addition to one or more antennas 24, the terminal of one embodiment of the present invention can include a transmitter 26, receiver 28, and controller 30 or other processor that provides signals to and receives signals from the transmitter and receiver, respectively. These signals include signaling information in accordance with the communication protocol(s) of the wireless communication system, and also user speech and/or user generated data. In this regard, the terminal can be capable of communicating in accordance with one or more of a number of different wireless communication protocols, such as those indicated above. Although not shown, the terminal can also be capable of communicating in accordance with one or more wireline and/or wireless networking techniques. More particularly, for example, the terminal can be capable of communicating in accordance with local area network (LAN), metropolitan area network (MAN), and/or a wide area network (WAN) (e.g., Internet) wireline networking techniques. Additionally or alternatively, for example, the terminal can be capable of communicating in accordance with wireless networking techniques including wireless LAN (WLAN) techniques such as IEEE 802.11, and/or WiMAX techniques such as IEEE 802.16 or the like.

It is understood that the controller 30 includes the circuitry required for implementing the audio and logic functions of the terminal 12. For example, the controller may be comprised of a digital signal processor device, a microprocessor device, and/or various analog-to-digital converters, digital-to-analog converters, and other support circuits. The control and signal processing functions of the terminal are allocated between these devices according to their respective capabilities. The controller can additionally include an internal voice coder (VC) 30a, and may include an internal data modem (DM) 30b. Further, the controller may include the functionally to operate one or more software applications, which may be stored in memory (described below).

The terminal 12 can also include a user interface including a conventional earphone or speaker 32, a ringer 34, a microphone 36, a display 38, and a user input interface, all of which are coupled to the controller 18. The user input interface, which allows the terminal to receive data, can comprise any of a number of devices allowing the terminal to receive data, such as a keypad 40, a touch display (not shown) or other input device. In embodiments including a keypad, the keypad includes the conventional numeric (0-9) and related keys (#, *), and other keys used for operating the terminal. Although not shown, the terminal can include one or more means for sharing and/or obtaining data (not shown).

In addition, the terminal 12 can include memory, such as a subscriber identity module (SIM) 42, a removable user identity module (R-UIM) or the like, which typically stores information elements related to a mobile subscriber. In addition to the SIM, the terminal can include other removable and/or fixed memory. In this regard, the terminal can include volatile memory 44, such as volatile Random Access Memory (RAM) including a cache area for the temporary storage of data. The terminal can also include other non-volatile memory 46, which can be embedded and/or may be removable. The non-volatile memory can additionally or alternatively comprise an EEPROM, flash memory or the like. The memories can store any of a number of software applications, instructions, pieces of information, and data, used by the terminal to implement the functions of the terminal.

From the descriptions of the network entities of the system, including the terminal 12, BS 14, BSC 16, MSC 18 and CN 22, it should be appreciated that the elements of the respective entities may be implemented by a number of various means, such as hardware and/or firmware, alone and/or under control of a computer program product. Generally, then, the network entities can include one or more logic elements for performing various functions of one the respective entities. As will be appreciated, the logic elements can be embodied in any of a number of different manners. In this regard, the logic elements performing the functions of the respective entities can be embodied in an integrated circuit assembly including one or more integrated circuits integral or otherwise in communication with the respective entities. The design of integrated circuits is by and large a highly automated process. In this regard, complex and powerful software tools are available for converting a logic level design into a semiconductor circuit design ready to be etched and formed on a semiconductor substrate. These software tools, such as those provided by Avant! Corporation of Fremont, Calif., and Cadence Design, of San Jose, Calif., automatically route conductors and locate components on a semiconductor chip using well established rules of design as well as huge libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Reference is now made to FIGS. 2 and 3, which illustrates a functional block diagram of the system 10 of FIG. 1 in accordance with one exemplary embodiment of the present invention. More particularly, FIG. 2 illustrates a functional block diagram of a multi-antenna transmission system including a transmitting entity 50 (e.g., base station 14). As shown in FIG. 3, the illustrated system is operating as a multiple-input single-output (MISO) communication system that also includes a single-antenna receiving entity 66 (e.g., terminal 12). It should be understood, however, that the system of exemplary embodiments of the present invention may equally operate in other configuration without departing from the spirit and scope of the present invention. It should further be understood that the transmitting and receiving entities may be implemented into any of a number of different types of transmission systems that transmit coded or uncoded digital transmissions over a radio interface.

In the illustrated MISO communication system 10, the transmitting entity 50 includes a MISO transmitter having a space-time-frequency (STF) encoder 52, a spread, filter and modulate (SFM) block 54 and n transmit antennas 56 (four being shown as antennas 56a-56d). In the transmitting entity, the transmitter receives an input symbol stream x(t), such as an input orthogonal frequency division multiple access (OFDMA) symbol stream, an input orthogonal frequency division multiplexed (OFDM) symbol stream or the like. For an n antenna transmitting entity, the STF encoder is capable of receiving a symbol stream x(t). In this regard the symbol stream can comprise any of a number of different pieces of data including, for example, symbols obtained from interleaved data that is encoded by a channel encoder such as a convolutional encoder, Turbo encoder, LDPC (low-density parity check) encoder or the like. Irrespective of the exact nature of the received symbol stream, the STF encoder is capable of coding every n symbols x(1), x(2), . . . x(n) in accordance with a STF technique based upon a plurality of STF codes, as explained below. The coded symbols of the symbol stream can then be filtered and modulated by the SFM block, and transmitted by the n antennas.

At the receiving entity 60, the receiving entity includes a receiver having a receive antenna 62, a filter, despread and demodulate (FDD) block 64 and a STF decoder 66. The receive antenna receives the data transmitted from the transmitting entity 50 and passes the data to the FDD block, which filters and demodulates the data into representations of the coded symbol stream from the transmitting entity. The STF decoder can then decode every n symbols x(1), x(2), . . . x(n) from the representations of the coded symbols in accordance with a STF technique based upon a plurality of STF codes, such as in the same manner as the STF encoder encodes the symbols of the input symbol stream, in a manner that minimizes the Hamming distance, Euclidean distance or the like between the transmitted and received signals.

As explained in the background section, in accordance with the Alamouti transmit diversity technique, in a time slot having with duration of two symbol periods, a two antenna transmitter codes a symbol stream according to a 2×2 Alamouti code or matrix. This kind of matrix, such as the 2×2 Alamouti matrix, that is used to represent transmit diversity over symbol periods is called a "space-time block code." In accordance with another transmit diversity technique, space-frequency technique, relies on coding across space and frequency by dividing the symbol stream into several parallel symbol streams and modulating each of these streams onto separate carriers or subcarriers at separate frequencies or within separate frequency bins. Further coding techniques, referred to as space-time-frequency coding techniques, offer a combination of space-time coding and space-frequency coding by coding symbols among transmit antennas in time and frequency.

As will be appreciated, coding symbol streams in accordance with a space-time-frequency coding technique can differ depending on the coding rate of the symbol streams. Exemplary embodiments of the present invention, then, will be described for coding rates one, two and four. It should be understood, however, that exemplary embodiments of the present invention may also be applicable to other coding rates, without departing from the spirit and scope of the present invention.

A. Rate-One Coding

As shown in FIG. 4, in accordance with a space-time-frequency coding technique, it has previously been proposed for the STF encoder 52 to code a symbol stream for a four antenna 56a-56d transmitting entity 50 in accordance with the following rate one STF code:

$$A = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}$$

As shown, the two sets of consecutive columns of the code span two frequency sub-carriers (or frequency bins) over two symbols of the input symbol stream, with the columns of each set spanning two time slots. As also shown, the rows of the code span the antennas 56a-56d of the transmitting entity 50. The STF code matrix A, then, repeats for a plurality of pairs of time slots and frequency sub-carriers in the time and frequency dimensions. If coding is not considered, code A is second-order diverse. With sufficient coding, however, code A is capable of attaining fourth-order diversity, as explained below with respect to exemplary embodiments of the present invention.

The signal model over a time slot of two symbols and a pair of frequencies can be presented in matrix form as follows:

$$y = A^T h + n$$

where $h = [h_1, h_2, h_3, h_4]$ represents frequency-flat channel coefficients, $A^T$ represents the code A matrix transpose, and n represents a column vector composed of additive white gaussian noise (AWGN) noise samples of variance $N_0$ per dimension (space, time, frequency). Assuming maximum-likelihood (ML) decoding by the STF decoder 66, the pair wise error probability of the 4-antenna code in AWGN channels can be upper bounded as follows:

$$P(c \to e) \leq E\left[Q\left(\sqrt{\frac{h^H D h}{N_0}}\right)\right]$$

where expectation operation E is performed over the channel statistics. The diagonal matrix D includes the distances, such as the Hamming distances, Euclidean distances or the like, seen by each channel coefficient along the error event path. Due to the presence of orthogonal STF codes, the diagonal entries of $D = \text{diag}[d_1, d_2, d_3, d_4]$ appear in pairs. In other words, among the four STF symbols, pairs of symbols experience the same channel due to space-time block code encoding.

The diversity order for a 4-antenna code is determined by the rank of D. The presence of the space-time block coding ensures a minimum of second-order diversity. Full fourth order diversity requires a powerful channel code. A rate ½ binary convolutional code may enable such fourth-order order diversity.

As will be appreciated, both diversity and coding gain of the presented code can be maximized by maximizing the trace of D (i.e., $d_{max}^H = \max \text{Trace}[D]$—H denoting the Hamming distance), and ensuring the diagonal entries of D approach equality. In this regard, diversity and coding gain can be maximized for a 4-antenna transmitting entity 50 by setting $d_1$ and $d_2$ equal to one another (i.e., $d_1 = d_2$). In practice, it is often difficult to design codes with equal distances (e.g., Hamming distances, Euclidean distances, etc.) for all error events. The condition $d_1 \neq d_2$ implies a reduction is coding gain, and particularly when a large imbalance exists between $d_1$ and $d_2$, can result in severe loss in the system.

In accordance with exemplary embodiments of the present invention, then, the STF encoder 52 is capable of coding a symbol stream in a manner that reduces the imbalance between the diagonal entries of D, thus maximizing the coding gain. More particularly, the STF encoder of exemplary embodiments of the present invention is capable of coding pieces of data, such as in a symbol stream, based upon a plurality of STF codes such that at least one STF code in the frequency dimension differs from at least one other STF code in the frequency dimension, as shown in FIG. 5. In this regard, for a 4-antenna transmitting entity 50, the STF encoder can be capable of coding a symbol stream in accordance with the following rate one STF codes:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, \quad A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

$$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

where $S_1$, $S_2$, $S_3$ and $S_4$ represent pieces of data (e.g., symbols), and $S^*_1$, $S^*_2$, $S^*_3$ and $S^*_4$ represent complex conjugates of the respective pieces of data (e.g., 1 5 symbols).

Matrix $A_1$ can (but need not) correspond to the previously proposed matrix A.

The second and third matrices, $A_2$ and $A_3$, then, can be formed by switching or otherwise exchanging at least two rows of matrix $A_1$ or the other of matrices $A_2$ and $A_3$ such that all of the matrices differ by the exchange of at least two rows. That is, matrix $A_2$ can be formed by exchanging the second and third rows of matrix $A_1$ (or vice versa), and matrix $A_3$ can be formed by exchanging the third and fourth rows of matrix $A_2$. It should be appreciated, however, that any one of the three matrices can be formed by exchanging at least two rows of any other matrix.

As shown in FIG. 5, in accordance with exemplary embodiments of the present invention the STF encoder 52 is capable of coding a symbol stream for a four antenna 56a-56d transmitting entity 50 in accordance with the above STF codes $A_1$, $A_2$ and $A_3$.

As shown, as in the case of coding the symbol stream with matrix A, the two sets of consecutive columns of the codes span two frequency sub-carriers (or frequency bins) over two symbols, with the columns of each set spanning two time slots. In addition, the rows of the code span the antennas of the transmitting entity. The STF code matrices can then repeat for a plurality of pairs of time slots in the time dimension. In the frequency dimension including frequency sub-carrier numbers f=1, 2, ... FFT, however, the matrices can sequentially circulate through sets of at least one frequency sub-carrier, and more typically through sets of at least one pair of frequency sub-carriers, in the frequency dimension. Accordingly, a matrix may repeat over pairs of frequency sub-carriers within a set of sub-carriers, and then circulate to the next matrix for the next set of sub-carriers, and so forth.

The number of frequency sub-carriers $N_c$ in the sets over which the matrices circulate can be set in any of a number of different manners such as, for example, by setting the number of sub-carriers to two (i.e., $N_c$=2). In such an instance, the first matrix $A_1$ can repeat for the first $N_c$ sub-carriers (i.e., f=1, ... $N_c$), after which the matrix circulates to matrix $A_2$ for the next $N_c$ sub-carriers (i.e., f=$N_c$+1, ... $2N_c$), and then circulates to matrix $A_3$ for the following $N_c$ sub-carriers (i.e., f=$2N_c$+1, ... $3N_c$). The matrices then circulate back to the first matrix $A_1$ and repeat. Generally, the matrix $A_k$ for a given sub-carrier frequency number f=1, 2, ... FFT can be identified as follows:

$$k(f) = \mathrm{mod}\left(\mathrm{floor}\left(\frac{f}{N_c}\right), 3\right) + 1$$

As can be shown, the pair-wise error probability for the circulating codes $A_1$, $A_2$ and $A_3$ takes the form:

$$P(c \to e) \leq E\left[Q\left(\sqrt{\frac{h^H \Lambda h}{N_0}}\right)\right]$$

where $\Lambda$ represents the diagonal matrix with entries, $\Lambda$=diag$[\check{d}_1, \check{d}_2, \check{d}_3, \check{d}_4]$. Unlike the non-circulating case with diagonal matrix D, $\Lambda$ now contains distinct diagonal entries, and better approximates the equal distance criterion (i.e., $\check{d}_1$=$\check{d}_2$), thus offering an increase in coding gain. To better illustrate the increased performance enabled by exemplary embodiments of the present invention, consider the graph of FIG. 6. In this regard, FIG. 6 compares the frame error rate (FER) of a 4-antenna MISO system including a STF encoder 52 coding symbol streams with matrix A, with the same STF encoder coding symbol streams with circulating matrices $A_k$, both for a pedestrian B channel rate ½ convolutional code, quadrature phase shift key (QPSK) modulated symbol stream. As shown, coding the symbol stream with circulating matrices $A_k$ can result in a code gain, such as a gain of up to 0.7 dB or more, over coding the symbol stream with matrix A. Similar gains can also be shown for other modulation and coding modes.

As will be appreciated, exemplary embodiments of the present invention may be equally applicable for transmitting entities 50 of different numbers of antennas 56, for different coding rates and/or for different size matrices $A_k$. For example, exemplary embodiments the present invention may be equally applicable for a three antenna 56a-56c transmitting entity, such as in a manner similar to that explained above.

Also, for example, exemplary embodiments of the present invention may be equally applicable for a six or eight antenna 56 transmitting entity 50. In this regard, for a 6-antenna transmitting entity, the STF encoder 52 can be capable of coding a symbol stream in accordance with the following rate one STF codes:

$$A_1 = \begin{bmatrix} S_1 & -S_2^* & 0 & 0 & 0 & 0 \\ S_2 & S_1^* & 0 & 0 & 0 & 0 \\ 0 & 0 & S_3 & -S_4^* & 0 & 0 \\ 0 & 0 & S_4 & S_3^* & 0 & 0 \\ 0 & 0 & 0 & 0 & S_5 & -S_6^* \\ 0 & 0 & 0 & 0 & S_6 & S_5^* \end{bmatrix},$$

$$A_2 = \begin{bmatrix} S_1 & -S_2^* & 0 & 0 & 0 & 0 \\ 0 & 0 & S_3 & -S_4^* & 0 & 0 \\ S_2 & S_1^* & 0 & 0 & 0 & 0 \\ 0 & 0 & S_4 & S_3^* & 0 & 0 \\ 0 & 0 & 0 & 0 & S_5 & -S_6^* \\ 0 & 0 & 0 & 0 & S_6 & S_5^* \end{bmatrix},$$

$$A_3 = \begin{bmatrix} S_1 & -S_2^* & 0 & 0 & 0 & 0 \\ 0 & 0 & S_3 & -S_4^* & 0 & 0 \\ 0 & 0 & S_4 & S_3^* & 0 & 0 \\ S_2 & S_1^* & 0 & 0 & 0 & 0 \\ 0 & 0 & 0 & 0 & S_5 & -S_6^* \\ 0 & 0 & 0 & 0 & S_6 & S_5^* \end{bmatrix},$$

$$A_4 = \begin{bmatrix} S_1 & -S_2^* & 0 & 0 & 0 & 0 \\ 0 & 0 & S_3 & -S_4^* & 0 & 0 \\ 0 & 0 & S_4 & S_3^* & 0 & 0 \\ 0 & 0 & 0 & 0 & S_5 & -S_6^* \\ S_2 & S_1^* & 0 & 0 & 0 & 0 \\ 0 & 0 & 0 & 0 & S_6 & S_5^* \end{bmatrix},$$

$$A_5 = \begin{bmatrix} S_1 & -S_2^* & 0 & 0 & 0 & 0 \\ 0 & 0 & S_3 & -S_4^* & 0 & 0 \\ 0 & 0 & S_4 & S_3^* & 0 & 0 \\ 0 & 0 & 0 & 0 & S_5 & -S_6^* \\ 0 & 0 & 0 & 0 & S_6 & S_5^* \\ S_2 & S_1^* & 0 & 0 & 0 & 0 \end{bmatrix}$$

As shown, matrix $A_2$ can be formed by exchanging the second and third rows of matrix $A_1$ (or vice versa), matrix $A_3$ can be formed by exchanging the third and fourth rows of matrix $A_2$, matrix $A_4$ can be formed by exchanging the fourth and fifth rows of matrix $A_3$, and matrix $A_5$ can be formed by exchanging the fifth and sixth rows of matrix $A_4$. Generally, then, matrix $A_k$ can be formed by exchanging the kth and (k+1)th rows of the previous matrix $A_{k-1}$, starting with an initial or first matrix $A_1$. It should be understood, however, that the rows of the matrices can be exchanged in any of a number of other patterns to form subsequent matrices. Thus, the STF encoder of an 8-antenna transmitting entity can be capable of coding a symbol stream in accordance with the following rate one STF code $A_1$, from which the other STF codes $A_2$-$A_7$ can be derived:

$$A_1 = \begin{bmatrix} S_1 & -S_2^* & 0 & 0 & 0 & 0 & 0 & 0 \\ S_2 & S_1^* & 0 & 0 & 0 & 0 & 0 & 0 \\ 0 & 0 & S_3 & -S_4^* & 0 & 0 & 0 & 0 \\ 0 & 0 & S_4 & S_3^* & 0 & 0 & 0 & 0 \\ 0 & 0 & 0 & 0 & S_5 & -S_6^* & 0 & 0 \\ 0 & 0 & 0 & 0 & S_6 & S_5^* & 0 & 0 \\ 0 & 0 & 0 & 0 & 0 & 0 & S_7 & -S_8^* \\ 0 & 0 & 0 & 0 & 0 & 0 & S_8 & S_7^* \end{bmatrix}$$

It should be understood that the STF encoder 52 for a 5 or 7-antenna 56 transmitting entity 50 can derive the STF codes from those for a 6 or 8-antenna transmitting entity, respectively. More particularly, the STF codes can be derived by coupling rows multiple rows of a matrix for an increased-antenna (e.g., 6 or 8-antenna) transmitting entity together and assigning the coupled rows to the same antenna of the reduced-antenna (5 or 7-antenna) transmitting entity. The coupled rows can then be treated as a single row for purposes of exchanging rows to derive the matrices for the antennas.

B. Rate-Two Coding

Similar to the rate one coding case, it has previously been proposed for the STF encoder 52 to code a symbol stream for a four antenna 56a-56d transmitting entity 50 in accordance with the following rate two STF code:

$$B = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}$$

As shown, the two sets of consecutive columns of the code span two frequency sub-carriers (or frequency bins) over two symbols, with the columns of each set spanning two time slots. As also shown, the rows of the code span the antennas 56a-56d of the transmitting entity 50. Similar to before, and in contrast to conventional coding techniques, the STF encoder of exemplary embodiments of the present invention is capable of coding pieces of data, such as in a symbol stream, based upon a plurality of STF codes such that at least one STF code in the frequency dimension differs from at least one other STF code in the frequency dimension. In this regard, for a 4-antenna transmitting entity 50, the STF encoder can be capable of coding a symbol stream in accordance with the following rate two STF codes:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, \quad B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, \quad B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

-continued $$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, \quad B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

Matrix $B_1$ can (but need not) correspond to the previously proposed matrix B. The second through sixth matrices, $B_2$, $B_3$, $B_4$, $B_5$ and $B_6$, then, can be formed by switching or otherwise exchanging at least two rows of matrix $B_1$ or one of the other of matrices $B_2$, $B_3$, $B_4$, $B_5$ and $B_6$ such that all of the matrices differ by the exchange of at least two rows. As in the case of the circulating $A_k$ matrices, however, it should be understood that any one of the six $B_k$ matrices can be formed by exchanging at least two rows of any other matrix.

Also similar to the case of circulating $A_k$ matrices, the STF encoder 52 can be capable of coding a symbol stream for a four antenna 56a-56d transmitting entity 50 in accordance with the above STF codes $B_1$, $B_2$, $B_3$, $B_4$, $B_5$ and $B_6$. As before, the two sets of consecutive columns of the codes span two frequency sub-carriers (or frequency bins) over two symbols, with the columns of each set spanning two time slots. In addition, the rows of the code span the antennas of the transmitting entity. The STF code matrices can then repeat for a plurality of pairs of time slots in the time dimension. In the frequency dimension including frequency sub-carrier numbers f=1, 2, . . . FFT, however, the matrices can sequentially circulate through sets of at least one frequency sub-carrier, and more typically through sets of at least one pair of frequency sub-carriers, in the frequency dimension. Accordingly, a matrix may repeat over pairs of frequency sub-carriers within a set of sub-carriers, and then circulate to the next matrix for the next set of sub-carriers, and so forth.

The number of frequency sub-carriers $N_c$ in the sets over which the matrices circulate can be set in any of a number of different manners such as, for example, by setting the number of sub-carriers to two (i.e., $N_c$=2). In such an instance, the first matrix $B_1$ can repeat for the first $N_c$ sub-carriers (i.e., f=1, . . . $N_c$), after which the matrix circulates to matrix $B_2$ for the next $N_c$ sub-carriers (i.e., f=$N_c$+1, . . . $2N_c$), and then circulates to matrix $B_3$ for the following $N_c$ sub-carriers (i.e., f=$2N_c$+1, . . . $3N_c$). The matrices continue to circulate through matrix $B_6$, and then back to the first matrix $B_1$ and repeat. Generally, the matrix $B_k$ for a given sub-carrier frequency number f=1, 2, . . . FFT can be identified as follows:

$$k(f) = \mathrm{mod}\left(\mathrm{floor}\left(\frac{f}{N_c}\right), 6\right) + 1$$

To further illustrate the increased performance enabled by exemplary embodiments of the present invention for the rate-two case, consider the graph of FIG. 7. Similar to FIG. 6, FIG. 7 compares the frame error rate (FER) of a 4-antenna MISO system including a STF encoder 52 coding symbol streams with matrix B, with the same STF encoder coding symbol streams with circulating matrices $B_k$, both for a pedestrian A channel, rate ½ convolutional code, quadrature phase shift key (QPSK) modulated symbol stream using a linear minimum mean square error (LMMSE) receiving entity 60. As shown, coding the symbol stream with circulating matrices $B_k$ can result in a coding gain, such as a gain of up to 1.0 dB or more, over coding the symbol stream with matrix B. Similar gains can also be shown for other modulation and coding modes.

As in the rate-one case, exemplary embodiments of the present invention may be equally applicable for transmitting entities 50 of different numbers of antennas 56, for different coding rates and/or for different size matrices $B_k$. For example, exemplary embodiments of the present invention may be equally applicable for 4×6 circulating matrices $B_k$, where $B_1$ may be represented as follows:

$$B_1 = \begin{bmatrix} S_1 & -S_2^* & S_5 & -S_7^* & S_9 & -S_{12}^* \\ S_2 & S_1^* & S_6 & -S_8^* & S_{10} & -S_{11}^* \\ S_3 & -S_4^* & S_7 & S_5^* & S_{11} & S_{10}^* \\ S_4 & S_3^* & S_8 & S_6^* & S_{12} & S_9^* \end{bmatrix}$$

and where the other matrices, $B_2$-$B_6$ may be derived therefrom. In such instances, the three pairs of consecutive columns of the code span three frequency sub-carriers (or frequency bins) over two symbols, with the columns of each set spanning two time slots. In addition, the rows of the code span the antennas 56a-56d of the transmitting entity 50. Alternatively, the six columns may span six frequency sub-carriers over one symbol, or may span one sub-carrier over six symbols.

C. Rate Four (and Three) Coding

For a rate four, 8-antenna 56 coding case, for example, circulating matrices $B_2$, $B_3$, $B_4$, $B_5$, $B_6$ and $B_7$ may be derived from the following first STF code matrix $B_1$:

$$B_1 = \begin{bmatrix} S_1 & -S_2^* \\ S_2 & S_1^* \\ S_3 & -S_4^* \\ S_4 & S_3^* \\ S_5 & -S_6^* \\ S_6 & S_5^* \\ S_7 & -S_8^* \\ S_8 & S_7^* \end{bmatrix}$$

The matrices $B_2$, $B_3$, $B_4$, $B_5$, $B_6$ and $B_7$ can be derived from matrix $B_1$ in a number of different manners, such as in a manner explained above. Irrespective of how the matrices $B_k$ are derived, STF encoder 52 of an 8-antenna transmitting entity 50 can then use those matrices to code an input symbol stream in a circulating manner in the frequency domain, as explained above. In such instances, the rows of the matrices can be mapped to antennas of the transmitting entity, and the columns may be mapped to either different input symbols or different sub-carries.

It should also be noted that STF code matrices $B_k$ for a rate-three case can be derived from those for the rate-four case. In such instances, the matrices $B_k$ can be derived by only considering six of the eight rows of the rate four matrices $B_k$.

According to one exemplary aspect of the present invention, the functions preformed by one or more of the entities of the system, such as the terminal 12, BS 14, BSC 16, MSC 18 and/or CN 22, may be performed by various means, such as hardware and/or firmware, including those described above, alone and/or under control of one or more computer program products. The computer program product(s) for performing one or more functions of embodiments of the present invention includes at least one computer readable storage medium, such as the non-volatile storage medium, and software including computer-readable program code portions, such as a series of computer instructions, embodied in the computer-readable storage medium.

In this regard, FIG. 5 is a control flow block diagram of methods, systems and program products according to exemplary embodiments of the present invention. It will be understood that each block or step of the control flow block diagram, and combinations of blocks in the control flow block diagram, can be implemented by various means, such as hardware, firmware, and/or software including one or more computer program instructions. As will be appreciated, any such computer program instructions may be loaded onto a computer or other programmable apparatus (i.e., hardware) to produce a machine, such that the instructions which execute on the computer or other programmable apparatus create means for implementing the functions specified in the control flow block diagram block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the control flow block diagram block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the control flow block diagram block(s) or step(s).

Accordingly, blocks or steps of the control flow block diagram support combinations of means for performing the specified functions, combinations of steps for performing the specified functions and program instruction means for performing the specified functions. It will also be understood that one or more blocks or steps of the control flow block diagram, and combinations of blocks or steps in the control flow block diagram, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor configured to implement a space-time-frequency (STF) coder to process a stream of a plurality of pieces of data,
wherein the STF coder is configured to code the pieces of data across space, time and frequency dimensions based upon a plurality of STF codes that each comprise a matrix including a plurality of columns and a plurality of rows, the rows extending across the time and frequency dimensions and the columns extending across the space dimension, and wherein the pieces of data are coded such that at least one STF code in the frequency dimension differs from at least one other STF code in the frequency dimension, at least one STF code differing from at least one other STF code by the exchange of at least two rows of the other STF code.

2. An apparatus comprising:
a processor configured to implement a space-time-frequency (STF) coder to process a stream of a plurality of pieces of data,
wherein the STF coder is configured to code the pieces of data across space, time and frequency dimensions based upon a plurality of STF codes, the pieces of data being coded such that at least one STF code in the frequency dimension differs from at least one other STF code in the frequency dimension,
wherein the frequency dimension includes a plurality of frequency bins, and wherein the STF coder is configured to code the pieces of data such that the plurality of STF codes sequentially circulates through sets of at least one frequency bin in the frequency domain.

3. An apparatus according to claim 2, wherein the STF coder is configured to code the pieces of data further such that the STF code for at least some of the respective sets of at least one frequency bin extends across the time domain at the respective sets of at least one frequency bin.

4. An apparatus according to claim 2 configured to operate with four antennas, wherein the STF coder is configured to code the pieces of data based upon at least three STF codes that sequentially circulate through sets of at least one frequency bin in the frequency domain.

5. An apparatus according to claim 4, wherein the STF coder is configured to code the pieces of data based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

$$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

and wherein $S_1$, $S_2$, $S_3$ and $S_4$ represent pieces of data, and $S^*_1$, $S^*_2$, $S^*_3$ and $S^*_4$ represent complex conjugates of the respective pieces of data.

6. An apparatus according to claim 4, wherein the STF coder is configured to code the pieces of data based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

and wherein $S_1, S_2, S_3, S_4, S_5, S_6, S_7$ and $S_8$ represent pieces of data, and $S^*_1, S^*_2, S^*_3, S^*_4, S^*_5, S^*_6, S^*_7$ and $S^*_8$ represent complex conjugates of the respective pieces of data.

7. An apparatus comprising:
a processor configured to implement a space-time-frequency (STF) decoder to process a stream of a plurality of pieces of data,
wherein the STF decoder is configured to decode the pieces of data across space, time and frequency dimensions based upon a plurality of STF codes that each comprise a matrix including a plurality of columns and a plurality of rows, the rows extending across the time and frequency dimensions and the columns extending across the space dimension, and
wherein the pieces of data are decoded such that at least one STF code in the frequency dimension differs from at least one other STF code in the frequency dimension, at least one STF code differing from at least one other STF code by the exchange of at least two rows of the other STF code.

8. An apparatus comprising:
a processor configured to implement a space-time-frequency (STF) decoder to process a stream of a plurality of pieces of data,
wherein the STF decoder is configured to decode the pieces of data across space, time and frequency dimensions based upon a plurality of STF codes, the pieces of data being decoded such that at least one STF code in the frequency dimension differs from at least one other STF code in the frequency dimension,
wherein the frequency dimension includes a plurality of frequency bins, and wherein the STF decoder is configured to decode the pieces of data such that the plurality of STF codes sequentially circulates through sets of at least one frequency bin in the frequency domain.

9. An apparatus according to claim 8, wherein the STF decoder is configured to decode the pieces of data further such that the STF code for at least some of the respective sets of at least one frequency bin extends across the time domain at the respective sets of at least one frequency bin.

10. An apparatus according to claim 8 configured to operate in a four-antenna transmission system, wherein the STF decoder is configured to decode the pieces of data based upon at least three STF codes that sequentially circulate through sets of at least one frequency bin in the frequency domain.

11. An apparatus according to claim 10, wherein the STF decoder is configured to decode the pieces of data based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

-continued $$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

and wherein $S_1$, $S_2$, $S_3$ and $S_4$ represent pieces of data, and $S^*_1$, $S^*_2$, $S^*_3$ and $S^*_4$ represent complex conjugates of the respective pieces of data.

12. An apparatus according to claim 10, wherein the STF decoder is configured to decode the pieces of data based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, \quad B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, \quad B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, \quad B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

and wherein $S_1$, $S_2$, $S_3$, $S_4$, $S_5$, $S_6$, $S_7$ and $S_8$ represent pieces of data, and $S^*_1$, $S^*_2$, $S^*_3$, $S^*_4$, $S^*_5$, $S^*_6$, $S^*_7$ and $S^*_8$ represent complex conjugates of the respective pieces of data.

13. A method of space-time-frequency coding pieces of data, the method comprising:
receiving a stream of a plurality of pieces of data in a multi-antenna transmission system; and
coding the pieces of data across space, time and frequency dimensions based upon a plurality of STF codes that each comprise a matrix including a plurality of columns and a plurality of rows, the rows extending across the time and frequency dimensions and the columns extending across the space dimension, and
wherein the pieces of data are coded such that at least one STF code in the frequency dimension differs from at least one other STF code in the frequency dimension, at least one STF code differing from at least one other STF code by the exchange of at least two rows of the other STF code.

14. A method of space-time-frequency coding pieces of data, the method comprising:
receiving a stream of a plurality of pieces of data in a multi-antenna transmission system; and
coding the pieces of data across space, time and frequency dimensions based upon a plurality of space-time-frequency (STF) codes, the pieces of data being coded such that at least one STF code in the frequency dimension differs from at least one other STF code in the frequency dimension,
wherein the frequency dimension includes a plurality of frequency bins, and wherein coding the pieces of data comprises coding the pieces of data such that the plurality of STF codes sequentially circulates through sets of at least one frequency bin in the frequency domain.

15. A method according to claim 14, wherein the coding step comprises coding the pieces of data further such that the STF code for at least some of the respective sets of at least one frequency bin extends across the time domain at the respective sets of at least one frequency bin.

16. A method according to claim 14, wherein the receiving step comprises receiving a stream of a plurality of pieces of data in a four antenna transmission system, and
wherein the coding step comprises coding the pieces of data based upon at least three STF codes that sequentially circulate through sets of at least one frequency bin in the frequency domain.

17. A method according to claim 16, wherein the coding step comprises coding the pieces of data based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, \quad A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

$$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

and wherein $S_1$, $S_2$, $S_3$ and $S_4$ represent pieces of data, and $S^*_1$, $S^*_2$, $S^*_3$ and $S^*_4$ represent complex conjugates of the respective pieces of data.

18. A method according to claim 16, wherein the coding step comprises coding the pieces of data based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, \quad B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, \quad B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, \quad B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

and wherein $S_1$, $S_2$, $S_3$, $S_4$, $S_5$, $S_6$, $S_7$ and $S_8$ represent pieces of data, and $S^*_1$, $S^*_2$, $S^*_3$, $S^*_4$, $S^*_5$, $S^*_6$, $S^*_7$ and $S^*_8$ represent complex conjugates of the respective pieces of data.

19. A method of space-time-frequency decoding pieces of data, the method comprising:
receiving a stream of a plurality of pieces of data in a multi-antenna transmission system; and
decoding the pieces of data across space, time and frequency dimensions based upon a plurality of STF codes that each comprise a matrix including a plurality of columns and a plurality of rows, the rows extending across the time and frequency dimensions and the columns extending across the space dimension, and wherein the pieces of data are decoded such that at least one STF code in the frequency dimension differs from at least one other STF code in the frequency dimension, at least one STF code differing from at least one other STF code by the exchange of at least two rows of the other STF code.

20. A method of space-time-frequency decoding pieces of data, the method comprising:

receiving a stream of a plurality of pieces of data in a multi-antenna transmission system; and decoding the pieces of data across space, time and frequency dimensions based upon a plurality of space-time-frequency (STF) codes, the pieces of data being decoded such that at least one STF code in the frequency dimension differs from at least one other STF code in the frequency dimension, wherein the frequency dimension includes a plurality of frequency bins, and wherein the decoding step comprises decoding the pieces of data such that the plurality of STF codes sequentially circulates through sets of at least one frequency bin in the frequency domain.

21. A method according to claim 20, wherein the decoding step comprises decoding the pieces of data further such that the STF code for at least some of the respective sets of at least one frequency bin extends across the time domain at the respective sets of at least one frequency bin.

22. A method according to claim 20, wherein the receiving step comprises receiving a stream of a plurality of pieces of data in a four antenna transmission system, and wherein the decoding step comprises decoding the pieces of data based upon at least three STF codes that sequentially circulate through sets of at least one frequency bin in the frequency domain.

23. A method according to claim 22, wherein the decoding step comprises decoding the pieces of data based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

$$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

and wherein $S_1$, $S_2$, $S_3$ and $S_4$ represent pieces of data, and $S^*_1$, $S^*_2$, $S^*_3$ and $S^*_4$ represent complex conjugates of the respective pieces of data.

24. A method according to claim 22, wherein the decoding step comprises decoding the pieces of data based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

and wherein $S_1$, $S_2$, $S_3$, $S_4$, $S_5$, $S_6$, $S_7$ and $S_8$ represent pieces of data, and $S^*_1$, $S^*_2$, $S^*_3$, $S^*_4$, $S^*_5$, $S^*_6$, $S^*_7$ and $S^*_8$ represent complex conjugates of the respective pieces of data.

25. A computer program product for space-time-frequency coding pieces of data, the computer program product comprising at least one computer-readable storage medium of at least one anchor network apparatus, the at least one computer-readable storage medium having computer-readable program code portions stored therein, the computer-readable program code portions comprising:

a first executable portion configured to receive a stream of a plurality of pieces of data in a multi-antenna transmission system; and a second executable portion configured to code the pieces of data across space, time and frequency dimensions based upon a plurality of STF codes that each comprise a matrix including a plurality of columns and a plurality of rows, the rows extending across the time and frequency dimensions and the columns extending across the space dimension, and wherein the pieces of data are coded such that at least one STF code in the frequency dimension differs from at least one other STF code in the frequency dimension, at least one STF code differing from at least one other STF code by the exchange of at least two rows of the other STF code.

26. A computer program product for space-time-frequency coding pieces of data, the computer program product comprising at least one computer-readable storage medium of at least one anchor network apparatus, the at least one computer-readable storage medium having computer-readable program code portions stored therein, the computer-readable program code portions comprising:

a first executable portion configured to receive a stream of a plurality of pieces of data in a multi-antenna transmission system; and a second executable portion configured to code the pieces of data across space, time and frequency dimensions based upon a plurality of space-time-frequency (STF) codes, the pieces of data being coded such that at least one STF code in the frequency dimension differs from at least one other STF code in the frequency dimension, wherein the frequency dimension includes a plurality of frequency bins, and wherein the second executable portion is configured to code the pieces of data such that the plurality of STF codes sequentially circulates through sets of at least one frequency bin in the frequency domain.

27. A computer program product according to claim 26, wherein the second executable portion is configured to code the pieces of data further such that the STF code for at least some of the respective sets of at least one frequency bin extends across the time domain at the respective sets of at least one frequency bin.

28. A computer program product according to claim 26, wherein the first executable portion is configured to receive a stream of a plurality of pieces of data in a four antenna transmission system, and
   wherein the second executable portion is configured to code the pieces of data based upon at least three STF codes that sequentially circulate through sets of at least one frequency bin in the frequency domain.

29. A computer program product according to claim 28, wherein the second executable portion is configured to code the pieces of data based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, \quad A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

$$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

and wherein $S_1$, $S_2$, $S_3$ and $S_4$ represent pieces of data, and $S^*_1$, $S^*_2$, $S^*_3$ and $S^*_4$ represent complex conjugates of the respective pieces of data.

30. A computer program product according to claim 28, wherein the second executable portion is configured to code the pieces of data based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, \quad B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, \quad B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, \quad B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

and wherein $S_1$, $S_2$, $S_3$, $S_4$, $S_5$, $S_6$, $S_7$ and $S_8$ represent pieces of data, and $S^*_1$, $S^*_2$, $S^*_3$, $S^*_4$, $S^*_5$, $S^*_6$, $S^*_7$ and $S^*_8$ represent complex conjugates of the respective pieces of data.

31. A computer program product for space-time-frequency decoding pieces of data, the computer program product comprising at least one computer-readable storage medium of at least one anchor network apparatus, the at least one computer-readable storage medium having computer-readable program decode portions stored therein, the computer-readable program decode portions comprising:
   a first executable portion configured to receive a stream of a plurality of pieces of data in a multi-antenna transmission system; and
   a second executable portion configured to decode the pieces of data across space, time and frequency dimensions based upon a plurality of STF codes that each comprise a matrix including a plurality of columns and a plurality of rows, the rows extending across the time and frequency dimensions and the columns extending across the space dimension, and
   wherein the pieces of data are decoded such that at least one STF code in the frequency dimension differs from at least one other STF code in the frequency dimension, at least one STF code differing from at least one other STF code by the exchange of at least two rows of the other STF code.

32. A computer program product for space-time-frequency decoding pieces of data, the computer program product comprising at least one computer-readable storage medium of at least one anchor network apparatus, the at least one computer-readable storage medium having computer-readable program decode portions stored therein, the computer-readable program decode portions comprising:
   a first executable portion configured to receive a stream of a plurality of pieces of data in a multi-antenna transmission system; and
   a second executable portion configured to decode the pieces of data across space, time and frequency dimensions based upon a plurality of space-time-frequency (STF) codes, the pieces of data being decoded such that at least one STF code in the frequency dimension differs from at least one other STF code in the frequency dimension,
   wherein the frequency dimension includes a plurality of frequency bins, and wherein the second executable portion is configured to decode the pieces of data such that the plurality of STF codes sequentially circulates through sets of at least one frequency bin in the frequency domain.

33. A computer program product according to claim 32, wherein the second executable portion is configured to decode the pieces of data further such that the STF code for at least some of the respective sets of at least one frequency bin extends across the time domain at the respective sets of at least one frequency bin.

34. A computer program product according to claim 32, wherein the first executable portion is configured to receive a stream of a plurality of pieces of data in a four antenna transmission system, and
   wherein the second executable portion is configured to decode the pieces of data based upon at least three STF codes that sequentially circulate through sets of at least one frequency bin in the frequency domain.

35. A computer program product according to claim 34, wherein the second executable portion is configured to decode the pieces of data based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, \quad A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

-continued $$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

and wherein $S_1$, $S_2$, $S_3$ and $S_4$ represent pieces of data, and $S^*_1$, $S^*_2$, $S^*_3$ and $S^*_4$ represent complex conjugates of the respective pieces of data.

36. A computer program product according to claim 34, wherein the second executable portion is configured to decode the pieces of data based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

and wherein $S_1$, $S_2$, $S_3$, $S_4$, $S_5$, $S_6$, $S_7$ and $S_8$ represent pieces of data, and $S^*_1$, $S^*_2$, $S^*_3$, $S^*_4$, $S^*_5$, $S^*_6$, $S^*_7$ and $S^*_8$ represent complex conjugates of the respective pieces of data.

37. An apparatus comprising:
a first means for receiving a stream of a plurality of pieces of data in a multi-antenna transmission system; and
a second means for coding the pieces of data across space, time and frequency dimensions based upon a plurality of STF codes that each comprise a matrix including a plurality of columns and a plurality of rows, the rows extending across the time and frequency dimensions and the columns extending across the space dimension, and
wherein the pieces of data are coded such that at least one STF code in the frequency dimension differs from at least one other STF code in the frequency dimension, at least one STF code differing from at least one other STF code by the exchange of at least two rows of the other STF code.

38. An apparatus comprising:
a first means for receiving a stream of a plurality of pieces of data in a multi-antenna transmission system; and
a second means for coding the pieces of data across space. time and frequency dimensions based upon a plurality of space-time-frequency (STF) codes. the pieces of data being coded such that at least one STF code in the frequency dimension differs from at least one other STF code in the frequency dimension,
wherein the frequency dimension includes a plurality of frequency bins, and wherein the second means is for coding the pieces of data such that the plurality of STF codes sequentially circulates through sets of at least one frequency bin in the frequency domain.

39. An apparatus according to claim 38, wherein the second means is for coding the pieces of data further such that the STF code for at least some of the respective sets of at least one frequency bin extends across the time domain at the respective sets of at least one frequency bin.

40. An apparatus according to claim 38, wherein the first means is for receiving a stream of a plurality of pieces of data in a four antenna transmission system, and
wherein the second means is for coding the pieces of data based upon at least three STF codes that sequentially circulate through sets of at least one frequency bin in the frequency domain.

41. An apparatus according to claim 40, wherein the second means is for coding the pieces of data based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

$$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

and wherein $S_1$, $S_2$, $S_3$ and $S_4$ represent pieces of data, and $S^*_1$, $S^*_2$, $S^*_3$ and $S^*_4$ represent complex conjugates of the respective pieces of data.

42. An apparatus according to claim 40, wherein the second means is for coding the pieces of data based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

and wherein $S_1$, $S_2$, $S_3$, $S_4$, $S_5$, $S_6$, $S_7$ and $S_8$ represent pieces of data, and $S^*_1$, $S^*_2$, $S^*_3$, $S^*_4$, $S^*_5$, $S^*_6$, $S^*_7$ and $S^*_8$ represent complex conjugates of the respective pieces of data.

43. An apparatus comprising:
a first means for receiving a stream of a plurality of pieces of data in a multi-antenna transmission system; and
a second means for decoding the pieces of data across space, time and frequency dimensions based upon a plurality of STF codes that each comprise a matrix including a plurality of columns and a plurality of rows, the rows extending across the time and frequency dimensions and the columns extending across the space dimension, and wherein the pieces of data being decoded such that at least one STF code in the frequency dimension differs from at least one other STF code in the frequency dimension, at least one STF code differing from at least one other STF code by the exchange of at least two rows of the other STF code.

44. An apparatus comprising:
a first means for receiving a stream of a plurality of pieces of data in a multi-antenna transmission system; and
a second means for decoding the pieces of data across space, time and frequency dimensions based upon a plurality of space-time-frequency (STF) codes, the pieces of data being decoded such that at least one STF code in the frequency dimension differs from at least one other STF code in the frequency dimension,
wherein the frequency dimension includes a plurality of frequency bins, and wherein the second means is for decoding the pieces of data such that the plurality of STF codes sequentially circulates through sets of at least one frequency bin in the frequency domain.

45. An apparatus according to claim 44, wherein the second means is for decoding the pieces of data further such that the STF code for at least some of the respective sets of at least one frequency bin extends across the time domain at the respective sets of at least one frequency bin.

46. An apparatus according to claim 44, wherein the first means is for receiving a stream of a plurality of pieces of data in a four antenna transmission system, and
wherein the second means is for decoding the pieces of data based upon at least three STF codes that sequentially circulate through sets of at least one frequency bin in the frequency domain.

47. An apparatus according to claim 46, wherein the second means is for decoding the pieces of data based upon the following three STF codes $A_1$, $A_2$ and $A_3$:

$$A_1 = \begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}, A_2 = \begin{bmatrix} S_1 & -S_2^* & 0 & 0 \\ 0 & 0 & S_3 & -S_4^* \\ S_2 & S_1^* & 0 & 0 \\ 0 & 0 & S_4 & S_3^* \end{bmatrix},$$

-continued $$A_3 = \begin{bmatrix} S_1 & -S_2^* & 0 & 0 \\ 0 & 0 & S_3 & -S_4^* \\ 0 & 0 & S_4 & S_3^* \\ S_2 & S_1^* & 0 & 0 \end{bmatrix}$$

and wherein $S_1$, $S_2$, $S_3$ and $S_4$ represent pieces of data, and $S^*_1$, $S^*_2$, $S^*_3$ and $S^*_4$ represent complex conjugates of the respective pieces of data.

48. An apparatus according to claim 46, wherein the second means is for decoding the pieces of data based upon the following six STF codes $B_1$, $B_2$, $B_3$, $B_4$, $B_5$ and $B_6$:

$$B_1 = \begin{bmatrix} S_1 & -S_2^* & S_5 & -S_7^* \\ S_2 & S_1^* & S_6 & -S_8^* \\ S_3 & -S_4^* & S_7 & S_5^* \\ S_4 & S_3^* & S_8 & S_6^* \end{bmatrix}, B_2 = \begin{bmatrix} S_1 & -S_2^* & S_5 & -S_7^* \\ S_2 & S_1^* & S_6 & -S_8^* \\ S_4 & S_3^* & S_8 & S_6^* \\ S_3 & -S_4^* & S_7 & S_5^* \end{bmatrix},$$

$$B_3 = \begin{bmatrix} S_1 & -S_2^* & S_5 & -S_7^* \\ S_3 & -S_4^* & S_7 & S_5^* \\ S_2 & S_1^* & S_6 & -S_8^* \\ S_4 & S_3^* & S_8 & S_6^* \end{bmatrix}, B_4 = \begin{bmatrix} S_1 & -S_2^* & S_5 & -S_7^* \\ S_4 & S_3^* & S_8 & S_6^* \\ S_2 & S_1^* & S_6 & -S_8^* \\ S_3 & -S_4^* & S_7 & S_5^* \end{bmatrix},$$

$$B_5 = \begin{bmatrix} S_1 & -S_2^* & S_5 & -S_7^* \\ S_3 & -S_4^* & S_7 & S_5^* \\ S_4 & S_3^* & S_8 & S_6^* \\ S_2 & S_1^* & S_6 & -S_8^* \end{bmatrix}, B_6 = \begin{bmatrix} S_1 & -S_2^* & S_5 & -S_7^* \\ S_4 & S_3^* & S_8 & S_6^* \\ S_3 & -S_4^* & S_7 & S_5^* \\ S_2 & S_1^* & S_6 & -S_8^* \end{bmatrix}$$

and wherein $S_1$, $S_2$, $S_3$, $S_4$, $S_5$, $S_6$, $S_7$ and $S_8$ represent pieces of data, and $S^*_1$, $S^*_2$, $S^*_3$, $S^*_4$, $S^*_5$, $S^*_6$, $S^*_7$ and $S^*_8$ represent complex conjugates of the respective pieces of data.

* * * * *

UNITED STATES PATENT AND TRADEMARK OFFICE
CERTIFICATE OF CORRECTION

PATENT NO. : 7,545,875 B2
APPLICATION NO. : 11/214323
DATED : June 9, 2009
INVENTOR(S) : Zhang et al.

It is certified that error appears in the above-identified patent and that said Letters Patent is hereby corrected as shown below:

Column 11,

Line 61, "code" should read --coding--.

Column 15,

Line 55, "sub-carries" should read --sub-carriers--;

Line 61, "preformed" should read --performed--.

Signed and Sealed this

Twenty-second Day of December, 2009

David J. Kappos
*Director of the United States Patent and Trademark Office*